United States Patent
Hanes et al.

(10) Patent No.: US 12,206,646 B2
(45) Date of Patent: *Jan. 21, 2025

(54) MANUFACTURER USAGE DESCRIPTION (MUD) EXTENSIONS FOR SECURE ACCESS SERVICE EDGE (SASE) SERVICES

(71) Applicant: Cisco Technology, Inc., San Jose, CA (US)

(72) Inventors: David Hanes, Lewisville, NC (US); Gonzalo Salgueiro, Raleigh, NC (US); Sebastian Jeuk, Munich (DE); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,156

(22) Filed: Dec. 12, 2023

(65) Prior Publication Data
US 2024/0146696 A1 May 2, 2024

Related U.S. Application Data

(63) Continuation of application No. 17/308,375, filed on May 5, 2021, now Pat. No. 11,929,984.

(51) Int. Cl.
*H04L 9/40* (2022.01)
*H04L 65/102* (2022.01)

(52) U.S. Cl.
CPC ...... *H04L 63/0263* (2013.01); *H04L 63/1416* (2013.01); *H04L 63/1425* (2013.01); *H04L 63/20* (2013.01); *H04L 65/102* (2013.01)

(58) Field of Classification Search
CPC ............. H04L 63/0263; H04L 63/1416; H04L 63/1425; H04L 63/20; H04L 65/102; H04L 63/023
(Continued)

(56) References Cited

U.S. PATENT DOCUMENTS

2017/0019390 A1   1/2017  Gu
2018/0115611 A1*  4/2018  Lear ........................ H04L 41/28
(Continued)

OTHER PUBLICATIONS

Lear, Eliot "Protecting the Internet of Things with MUD", APNIC, May 14, 2019, 6 pages.
(Continued)

*Primary Examiner* — Michael S McNally
(74) *Attorney, Agent, or Firm* — Lee & Hayes, P.C.

(57) ABSTRACT

Techniques for associating manufacturer usage description (MUD) security profiles for Internet-of-Things (IoT) device (s) with secure access service edge (SASE) solutions, providing for automated and scalable integration of IoT devices with SASE frameworks. A MUD controller may utilize a MUD uniform resource identifier (URI) emitted by an IoT device to fetch an associated MUD file from a MUD file server associated with a manufacturer of the IoT device. The MUD controller may determine that a security recommendation included in the MUD file is to be implemented by a cloud-based security service provided by the SASE service and cause the IoT device to establish a connection with a secure internet gateway associated with the cloud-based security service. Additionally, or alternatively, the MUD file may include SASE extensions indicating manufacturer recommended cloud-based security services. Further, cloud-based security services may be implemented if local services are unavailable.

20 Claims, 6 Drawing Sheets

(58) Field of Classification Search
USPC .............................................................. 726/1
See application file for complete search history.

(56) References Cited

U.S. PATENT DOCUMENTS

| | | |
|---|---|---|
| 2018/0316563 A1 | 11/2018 | Kumar et al. |
| 2019/0110298 A1* | 4/2019 | Lear ..................... H04W 88/12 |
| 2019/0260751 A1 | 8/2019 | Kale et al. |
| 2020/0136991 A1 | 4/2020 | Salgueiro et al. |
| 2022/0103597 A1 | 3/2022 | Gobena et al. |
| 2022/0360562 A1 | 11/2022 | Hanes |

OTHER PUBLICATIONS

Matheu, Sara N. et al., "Security Architecture for Defining and Enforcing Security Profiles in DLT/SDN-Based IoT Systems", Mar. 28, 2020, MDPI, 33 pages.

Office Action for U.S. Appl. No. 17/308,375, mailed on Aug. 10, 2023, Hanes, "Manufacturer Usage Description (MUD) Extensions for Secure Access Service Edge (SASE) Services ", 7Pages.

* cited by examiner

MANUFACTURER USAGE DESCRIPTION (MUD) EXTENSIONS FOR SECURE ACCESS SERVICE EDGE (SASE) SERVICES

RELATED APPLICATIONS

This application claims priority to U.S. patent application Ser. No. 17/308,375, filed on May 5, 2021; the entire contents of which are incorporated herein by reference.

TECHNICAL FIELD

The present disclosure relates generally to associating manufacturer usage description (MUD) files for Internet-of-Things (IoT) devices with secure access service edge (SASE) services.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, Internet-of-Things (IoT) devices are now becoming more managed or are consuming cloud-resources. Cloud-based Software-as-a-Service (SaaS) are also expanding and are supporting IoT endpoints. As these cloud-base services expand, IoT devices will begin to require specific cloud-based services as they are deployed, and as new technologies are developed, IoT devices will need to support further cloud-based services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a method for a MUD controller associated with a SASE service to receive a MUD file associated with an IoT device from a server associated with a manufacturer of the IoT device, determine that a security recommendation included in the MUD file is implemented by a cloud-based security service provided by the SASE service, and cause the IoT device to establish a connection with a gateway device associated with the cloud-based security service. The method includes receiving, at a manufacturer usage description (MUD) controller associated with a secure access service edge (SASE) service, a MUD uniform resource identifier (URI) indicating a type of an Internet-of-Things (IoT) device. Additionally, or alternatively, the method includes sending the MUD URI to a server associated with a manufacturer of the IOT device. Additionally, or alternatively, the method includes receiving a MUD file from the server. Additionally, or alternatively, the MUD file may include a security recommendation associated with the IoT device. Additionally, or alternatively, the method includes determining, by the MUD controller, that the security recommendation included in the MUD file is implemented by a security service provided by the SASE service. Additionally, or alternatively, the method includes causing the IoT device to establish a connection with a gateway device associated with the security service provided by the SASE service.

Additionally, or alternatively, the method includes receiving, at a manufacturer usage description (MUD) controller associated with a secure access service edge (SASE) service, a MUD uniform resource identifier (URI). Additionally, or alternatively, the method sending the MUD URI to a server associated with a manufacturer of an Internet-of-Things (IoT) device indicated by the MUD URI. Additionally, or alternatively, the method includes receiving a MUD file from the server. Additionally, or alternatively, the MUD file may include a cloud-based security recommendation associated with the IoT device. Additionally, or alternatively, the cloud-based security recommendation may be implemented by a security service provided by the SASE service. Additionally, or alternatively, the method includes causing the IoT device to establish a connection with a gateway device associated with the security service provided by the SASE service.

Additionally, the techniques described herein may be performed by a system and/or device having non-transitory computer-readable media storing computer-executable instructions that, when executed by one or more processors, performs the method described above.

Example Embodiments

The usefulness of solutions offered by service providers has resulted in a rapid increase in cloud computing offering a wide range of services that may be fined-tuned to meet a user's needs. For example, security access service edge (SASE), as a framework to deliver security as a service at the edge of a network, streamlines the way security is delivered to any type of endpoint at the edge. However, a single security approach per user is no longer sufficient and won't provide the most optimal security capabilities specific to an endpoint, an application executing on an endpoint, and/or a tenant occupying an endpoint. As such, there is a need to offer security as a service specific to a tenant, application, endpoint, and/or any combination thereof. Additionally, Internet-of-Things (IoT) devices are now becoming more managed or are consuming cloud-resources. Cloud-based Software-as-a-Service (SaaS) are also expanding and are supporting IoT endpoints. As these cloud-base services expand, IoT devices will begin to require specific cloud-based services as they are deployed, and as new technologies are developed, IoT devices will need to support further cloud-based services, such as SASE.

When an IoT device is deployed, it may be unknown which services it requires and how it will consume such services. Accordingly, manufacturer usage description (MUD) is used to facilitate device visibility and segmentation by allowing network administrators to effortlessly identify a type of the IoT device and define the corresponding appropriate behaviors for the IoT device. Specifically, security policies defined by the manufacturer can be read by a MUD controller and applied to an associated network for an IoT device. With SASE architectures, the security policies defined by MUD for an IoT device may still be valid, but they are not configured to fully leverage SASE functions and capabilities. The association between the MUD profile of an IoT endpoint and SASE raises a problem with respect to supporting the onboarding of massive numbers of IoT devices within a SASE framework. Additionally, MUD extensions may be helpful to optimally ensure the securing of an IoT device in SASE solutions.

This disclosure describes techniques to associate MUD security profiles for IoT device(s) with SASE solutions, providing for automated and scalable integration of IoT devices with SASE frameworks. For example, when an IoT device emits a uniform resource identifier (URI), the URI is used by a MUD controller, associated with an IoT gateway device, to pull a manufacturer recommended security profile (also referred to herein as a "MUD file"), indicating what protocols should be allowed for such an IoT device as well as the ports that should be allowed, from the manufacturer's server. In some examples, the MUD controller may be configured to parse such a MUD file and specific cloud-based SASE requirements of the IoT device may be defined, and the MUD controller may be configured to generate a SASE security profile based on parsing the MUD file. In some examples, the IoT gateway may then communicate with a SASE service and send the SASE profile and/or request the required security services for the IoT device. Because these required security services are implemented by the SASE architecture, the SASE profile may be implemented as a cloud service. This may be achieved by establishing a connection between the IoT device and a secure internet gateway (SIG) associated with the SASE service, which implements the required security services for the IoT device. Additionally, or alternatively the MUD file may include an indication as to which SASE cloud services are recommended on a per-IoT device basis, and the MUD controller may implement security requirements to the IoT device(s) if the services are available, or the MUD controller may redirect traffic from the IoT device to the recommended SASE cloud service indicated in the MUD file.

Take, for example, an IoT device connecting to the internet. The IoT device may emit a UM, which is received and utilized by an IoT gateway device to request and/or pull a MUD file from MUD file server, associated with a manufacturer of the IoT device, on the internet. The IoT gateway may comprise a MUD controller configured to facilitate the transmission of the URI from the IoT device to the MUD file server. The MUD file server may provide the MUD file associated with the IoT device to the MUD controller. The MUD file may be configured as a traditional MUD file and may indicate which protocols and/or ports should be allowed for a particular IoT device.

In some examples, the MUD controller may then parse the MUD file to determine one or more intent(s) of the MUD file and/or translate the intent(s) to requirements for the SASE service(s). For example, the MUD controller may parse the MUD file and specific SASE security requirements of the IoT device may be defined based on the determined intent. Additionally, or alternatively, the MUD controller may generate a SASE profile, including the SASE specific requirements, for the IoT device. The IoT gateway associated with the MUD controller may communicate the SASE security requirements and/or the SASE profile with a SIG associated with a SASE cloud service and request the security services required and/or recommended for the IoT device. The SASE security requirements may be associated with at least one of, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy.

The SASE security requirements and/or the SASE security profile may be implemented as a cloud service. In some examples, implementation of such cloud services may comprise establishing a software-defined wide-area network (SD-WAN) connection to the SIG associated with the SASE cloud service configured to implement the required security services for the IoT device. For example, if the MUD file and/or the intent of the MUD file indicates that SCADA DPI is required for a certain IoT device, such a security requirement may be communicated from the IoT gateway device to the associated cloud service. The SIG associated with the SASE cloud service may then implement this security requirement for the IoT device. Such a configuration allows for flexibility and scalability to allow each IoT device to have a different set of cloud-based security services, defined by the MUD file and/or SASE profile generated by the IoT gateway device.

The SIG associated with the SASE service may be configured to implement the security requirements. In some examples, the SIG may identify and/or contact an IoT application to provide the required security services for the IoT device. Take the previous example, when the MUD file and/or the intent of the MUD file indicates that SCADA DPI is required for the IoT device, SIG may reach out to an IoT application capable of providing the necessary SCADA security. The required security services (e.g., SCADA DPI) may then be implemented by the IoT application provided by the SASE service.

Additionally, or alternatively, the MUD standard may be extended to include SASE capabilities, such as, for example, enabling IoT devices to consume manufacturer recommended security features via the SASE service if such services are unavailable at the local site associated with the IoT gateway. For example, the extension to the MUD standard may include one or more indications from the manufacturer in the MUD file indicating which SASE services are recommended on a per-IoT device basis. The MUD file may include recommendations including services such as, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy. Additionally, or alternatively, the MUD file may provide a recommendation of the specific SASE service(s) for each device. For example, if an IoT device is configured as a temperature sensor, the MUD file may contain recommendations and/or instructions to provide SCADA industrial protection, and may provide the details of a SIG associated with a corresponding service, such that the IoT device may connect to the SIG and the required security service(s) may be implemented accordingly.

The MUD controller may receive the MUD file and either implement these security requirements to the network elements (i.e., the IoT device(s)) if the services are available locally to the IoT gateway, or the MUD controller may redirect traffic from the IoT device to the recommended SASE cloud service indicated in the MUD file. The recommended SASE cloud services may be configured as a recommendation, and a client may choose which services they wish to implement via the SASE service and which services they wish to implement locally. Accordingly, the IoT gateway may be configured to offer local security services that are available and may utilize cloud-based services if the local security services are unavailable, for example.

In some examples, IoT devices, such as, for example, the IoT gateway device, may have varying amount of computational power and may not be able to support certain security services. Additionally, or alternatively, an organization and/or an enterprise may employ a security service that is not capable of implementing the recommended security services (e.g., SCADA). In such cases, the MUD controller may be configured to make a decision to offer the security service locally, from the recommended SASE service as indicated in the MUD file, or to ignore the recommendation.

As described herein, a computing-based and/or cloud-based solution and/or service can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to providing security as a service specific to an IoT device. For instance, the techniques described herein may parse a MUD file to determine an intent and translate the intent into security requirements and/or recommendations for SASE services. By parsing the MUD file to translate an intent into security requirements for SASE services an IoT device may be able to fully leverage SASE services and capabilities. Additionally, or alternatively, by including indications of SASE services that are recommended on a per-IoT device basis, computational power may be selectively utilized by an IoT gateway implementing security services available locally and leveraging SASE security services for services that are unavailable. Additionally, the MUD controller may be configured to override such SASE service recommendations and implement the services locally instead.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
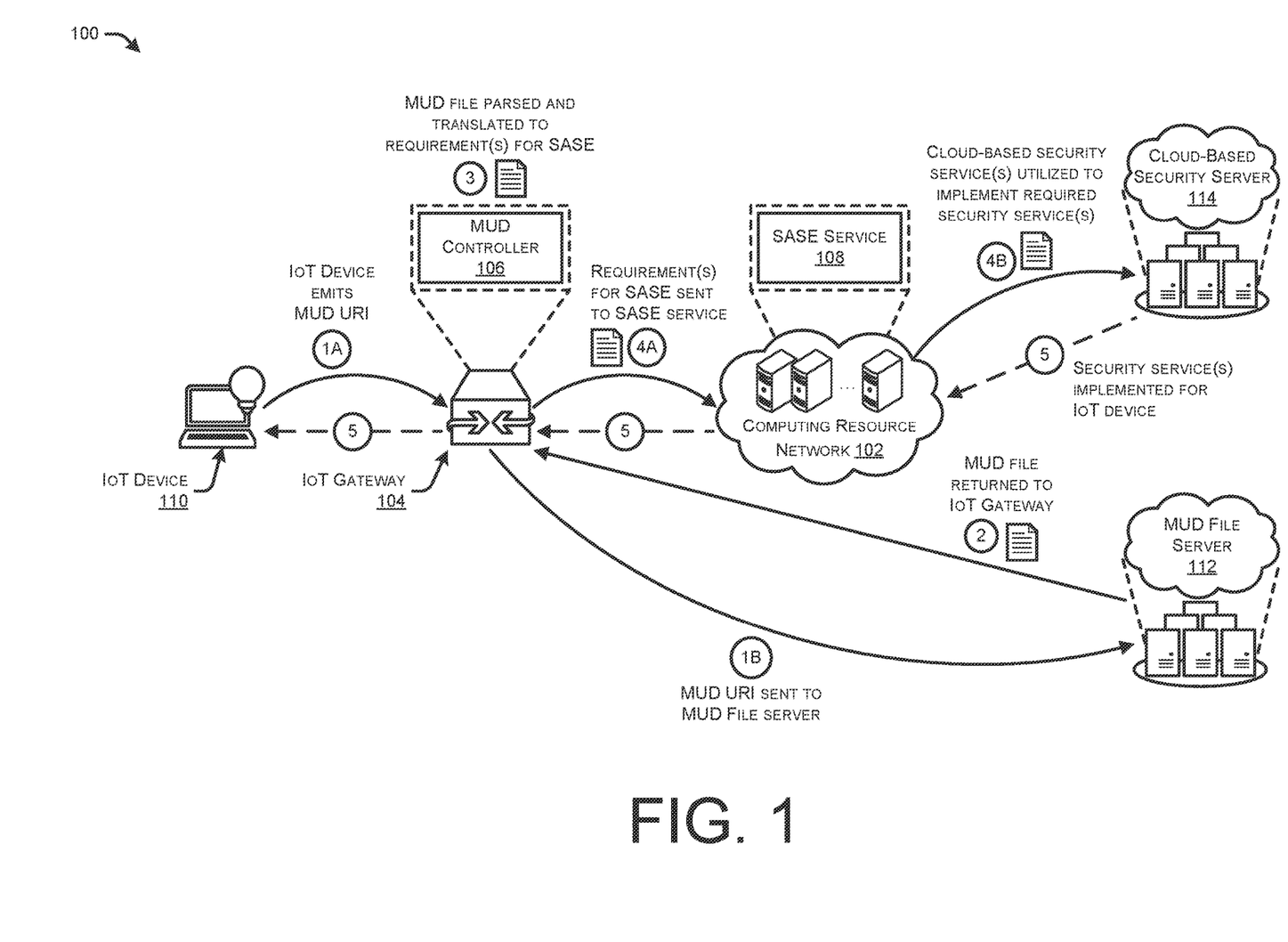
FIG. 1 illustrates a system-architecture diagram of an example flow for a manufacturer usage description (MUD) controller associated with a secure access service edge (SASE) service to receive a MUD file including security recommendations associated with an Internet-of-Things (IoT) device, determine that at least one of the security recommendations is implemented by a security service provided by the SASE service, and cause the IoT device to establish a connection with a gateway device associated with the security service.

FIG. 1 illustrates a system-architecture diagram including a computing resource network 102 and an example flow for an IoT gateway 104 hosting a manufacturer usage description (MUD) controller 106 associated with a secure access service edge (SASE) service 108 to receive a MUD file from a MUD file server 112 including security recommendations associated with an Internet-of-Things (IoT) device 110, determine that at least one of the security recommendations is implemented by a security service provided by the SASE service 108, and cause the IoT device 110 to establish a connection with a cloud-based security server 114 (also referred to herein as a "gateway device" or "SIG") associated with the security service.

The computing resource network 102 may comprise one or more data centers that include various networking components, such as, a Software-Defined-Networking (SDN) controller, spine network switches, and network switches (also referred to as nodes) operating on physical servers. In some examples, one or more network switches may be configured as a network edge node. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, the spine network switch(es), the network node(s), and/or the network edge nodes. Additionally, or alternatively, the one or more virtual machine(s) operating on a physical server associated with a network edge node may execute the SASE service 108.

Take, for example, an IoT device 110 which emits a uniform resource identifier (URI), the URI is used by a MUD controller 106, associated with an IoT gateway device 104, to pull a manufacturer recommended security profile (also referred to herein as a "MUD file"), indicating what protocols should be allowed for such an IoT device as well as the ports that should be allowed, from the MUD file server 112. In some examples, the MUD controller 106 may be configured to parse such a MUD file and specific cloud-based SASE requirements of the IoT device 110 may be defined, and the MUD controller 106 may be configured to generate a SASE security profile based on parsing the MUD file. In some examples, the IoT gateway 104 may then communicate with a SASE service 108 and send the SASE profile and/or request the required security services for the IoT device 110. Because these required security services are implemented by the SASE architecture, the SASE profile may be implemented as a cloud service. This may be achieved by establishing a connection between the IoT device 110 and a SIG of a cloud-based security server 114 associated with the SASE service 108, which implements the required security services for the IoT device 110.

At "1A," an IoT device 110 may request to connect to the internet via one or more network(s). In some examples, the IoT device 110 may emit a URI including an indication of the type of the IoT device 110. The URI may be captured or otherwise received by an IoT gateway 104 configured to facilitate the IoT device 110 with the connection to the internet.

At "1B," the IoT gateway 104 may utilize the URI that was emitted by the IoT device 110 to request and/or pull a MUD file from a MUD file server 112, associated with a manufacturer of the IoT device 110, on the internet. The IoT gateway 104 may comprise a MUD controller 106 configured to facilitate the transmission of the URI from the IoT device 110 to the MUD file server 112.

At "2," the MUD file server 112 may utilize the URI to identify a MUD file associated with the IoT device 110. In some examples, the MUD file server 112 may provide the MUD file to the IoT gateway device 104 and/or the MUD controller 106. The MUD file may be configured in various ways, such as, for example, as a traditional MUD file that may indicate which protocols and/or ports should be allowed for a particular IoT device 110.

At "3," the MUD controller 106 may then parse the MUD file to determine one or more intent(s) of the MUD file and/or translate the intent(s) to requirements for the SASE service(s) 108. For example, the MUD controller 106 may parse the MUD file and specific SASE security requirements of the IoT device 110 may be defined based on the determined intent. Additionally, or alternatively, the MUD controller 106 may generate a SASE profile, including the SASE specific requirements, for the IoT device 110.

At "4A," the MUD controller 106 may send the requirements for the SASE service 108 to the SASE service 108. For example, the IoT gateway 104 associated with the MUD controller 106 may communicate the SASE security requirements and/or the SASE profile with a SIG associated with a SASE cloud service 108 and request the security services required and/or recommended for the IoT device 110. The SASE security requirements may be associated with at least one of, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy.

The SASE security requirements and/or the SASE security profile may be implemented as a cloud service. In some examples, implementation of such cloud services may comprise establishing a software-defined wide-area network (SD-WAN) connection to a SIG associated with the SASE service 108 configured to implement the required security services for the IoT device 110. For example, if the MUD file and/or the intent of the MUD file indicates that SCADA DPI is required for the IoT device 110, such a security requirement may be communicated from the IoT gateway 104 device to the SASE service 108, and the SASE service 108 may provide the security requirement via the associated cloud-based security server 114.

At "4B," The SIG associated with the SASE service 108 may be configured to implement the security requirements. In some examples, the SIG may identify and/or contact an IoT application associated with a cloud-based security server 114 to provide the required security services for the IoT device 110. Take the previous example, when the MUD file and/or the intent of the MUD file indicates that SCADA DPI is required for the IoT device 110, SIG may reach out to the cloud-based security server 114 associated with an IoT application capable of providing the necessary SCADA security. The required security services (e.g., SCADA DPI) may then be implemented by the IoT application provided by the SASE service 108.

At "5," The SIG associated with the cloud-based security server 114 may then implement this security requirement for the IoT device 110. Such a configuration allows for flexibility and scalability to allow each IoT device 110 to have a different set of cloud-based security services, defined by the MUD file and/or SASE profile generated by the IoT gateway device 104 and/or the MUD controller 106.

Take, for example, an enterprise having an enterprise network 104 in communication with a computing resource network 102 as described herein. Such an enterprise may have various users 128 accessing the computing resource network 102 via one or more endpoints 126, such as, for example, user devices 126. In such an example, when a new endpoint connects to the computing resource network 102, via an edge node 114 of the computing resource network 102, the SASE engine 120 associated with the edge node 114 may be configured to generate a security profile associated with the endpoint 126. The SASE engine 120 may generate a security profile based at least partly on data received from the enterprise network 104, a default security profile associated with the computing resource network 102, contextual endpoint information, and/or any combination thereof. Additionally, or alternatively, the SASE engine 120 may be configured to store an endpoint profile mapping 124 between one or more security profiles and the endpoint 126. In some examples, the SASE engine 120 may be configured to evaluate a traffic flow associated with the endpoint 126 based at least partly on the security profile associated with the endpoint 126. Additionally, or alternatively, the SASE engine 120 may be configured to evaluate the traffic flow associated with the endpoint 126 based on various security profiles associated with the endpoint 126, such that the SASE engine 120 may be configured to autonomously select between security profiles associated with the endpoint 126, based on contextual data associated with the endpoint 126, an application executing on the endpoint 126, a tenant associated with the endpoint 126, and/or any combination thereof.

At "1," a network device associated with a computing resource network 102 may execute a context-aware SASE engine 120. In some examples, the SASE engine 120 may be deployed at various locations in the computing resource network 102, such as, for example, network components (i.e., a network controller 108, spine switch(es) 110, leaf switch(es) 112, node(s) 112, etc.), endpoints 126 associated with the network 102, and/or any other device(s) and/or node(s) associated with the network 102. Additionally, or alternatively, the SASE engine 120 may be configured as a software agent executing on any one of the network components associated with the computing resource network 102. For example, the SASE engine 120 may be deployed at an edge node 114 of the computing resource network 102. In some examples, the edge node 114 may be configured to communicate with one or more enterprise network(s) 104 via one or more network(s) 130. Additionally, or alternatively, an edge node 114 may be configured to execute and/or maintain the SASE engine 120 and/or a security profiles data store 122. In some examples, the security profiles data store 122 may comprise an endpoint table mapping 124, where endpoints associated with the edge node 114 may be mapped to corresponding security profiles (i.e., enterprise default security profiles and/or custom endpoint security profiles).

In some examples, at "2A," the SASE engine 120 may receive data, representing a default security profile and/or a basic set of information relevant to the specific edge cloud and/or branch of an enterprise, from an associated enterprise network 104. For example, the enterprise network 104 may be configured to exchange data with the SASE engine 120 and describe standard security functions that each endpoint 126, application, and/or tenant should receive, describe traffic patterns associated with the endpoint 126, and/or inform the SASE engine 120 about the negotiation level.

Additionally, or alternatively, at "2B," the SASE engine 120 may generate a security profile associated with an endpoint 126(1) based on endpoint information received from the endpoint 126(1). For example, the SASE engine 120 may receive data 132(1) representing endpoint information from the endpoint 126(1). In some examples, the endpoint information may comprise a security profile that is specific to the endpoint 126(1), an application that is executing on the endpoint 126(1), and/or the tenant and/or user associated with the endpoint 126(1).

At "3," the SASE engine 120 may then utilize the default security profile and/or the additional data received from the enterprise network 104 to generate a security profile for an endpoint 126(2) associated with the enterprise and accessing the network 102. The SASE engine may also be configured to store the security profile in a security profiles database 122 including a endpoint profile mapping 124 between the security profile and the endpoint 126(2). Additionally, or alternatively, the SASE engine 120 may then utilize the received endpoint information to generate an endpoint specific security profile associated with the endpoint 126(1) and specific to the endpoint/application/tenant tuple. The SASE engine 120 may also be configured to store the security profile in a security profiles database 122 including an endpoint profile mapping 124 between the security profile and the endpoint 126(1).

Additionally, at "3," the SASE engine 120 may evaluate the traffic flow associated with an endpoint 126 based on various security profiles and/or rule sets associated with the endpoint 126. For example, the SASE engine 120 may evaluate the traffic flow associated with endpoint 1 126(1) based on the endpoint specific security profile generated from the data 132(1) indicating the endpoint information received from and associated with the endpoint 126(1). Additionally, or alternatively, the SASE engine 120 may evaluate the traffic flow associated with endpoint N 126(2) based on the security profile associated with the endpoint 126(2) and based on the default security profile received from the enterprise network 104. Additionally, or alternatively, the SASE engine 120 may be configured to generate a formatted security profile by compiling a security profile associated with an endpoint 126 into a format that is executable by an additional network device of the network 102 (e.g., an additional network edge device 114, an additional network switch 110, 112, a computing resource 118 executing on an additional network device 116, or the like). The SASE engine 120 may then send the formatted security profile to the additional network device where the traffic flow associated with the endpoint 126 may be evaluated by the additional network device. The SASE engine 120 may deliver security as a service to the endpoint 126 by evaluating the traffic flow on the network device executing the SASE engine 120 and/or by evaluating the traffic flow on an additional associated network device executing a SASE engine 120.

Figure 2:
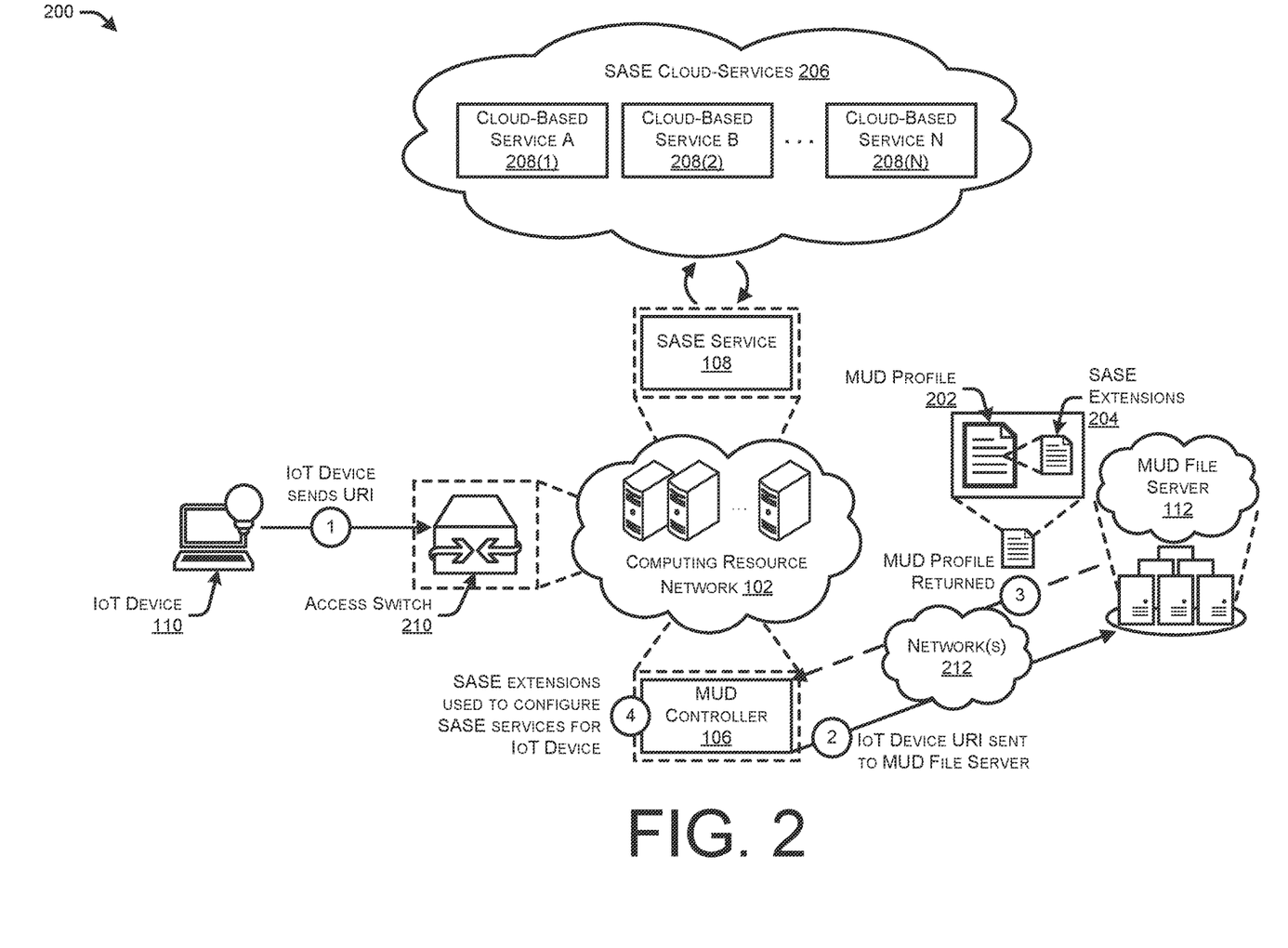
FIG. 2 illustrates system-architecture diagram of an example flow for a MUD controller associated with a SASE service to receive a MUD file, including SASE extensions, associated with an IoT device and using the SASE extensions to configure SASE services for the IoT device.

FIG. 2 illustrates system-architecture diagram including a computing resource network 102 and an example flow for a MUD controller 106 associated with a SASE service 108 to receive a MUD file 202, including SASE extensions 204, associated with an IoT device 110 and using the SASE extensions 204 to configure SASE cloud-services 206, including one or more cloud-based security services 208(1)-208(N) for the IoT device 110.

The computing resource network 102 may comprise one or more data centers that include various networking components, such as, a Software-Defined-Networking (SDN) controller, spine network switches, and network switches (also referred to as nodes) operating on physical servers. In some examples, one or more network switches may be configured as a network edge node. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, the spine network switch(es), the network node(s), and/or the network edge nodes. Additionally, or alternatively, the one or more virtual machine(s) operating on a physical server associated with a network edge node may execute the SASE service 108.

Take, for example, an IoT device 110 which emits a uniform resource identifier (URI), the URI is received and/or collected by an access switch 210 that may be local to the IoT device 110 and/or remote from the IoT device 110 and associated with the computing resource network 102. The URI may be used by a MUD controller 106 to pull a manufacturer recommended security profile (also referred to herein as a "MUD file"), indicating what protocols should be allowed for such an IoT device 110 as well as the ports that should be allowed, from a MUD file server 112 associated with a manufacturer of the IoT device 110. The MUD file 202 may include SASE extensions 204 indicating which SASE cloud services 206 are recommended on a per-IoT device basis, and the MUD controller 106 may implement security requirements to the IoT device(s) 110 if the services are available, or the MUD controller 106 may redirect traffic from the IoT device 106 to the recommended SASE cloud service 206 indicated in the MUD file 202.

At "1," an IoT device 110 may request to connect to the internet via one or more network(s) 212. In some examples, the IoT device 110 may emit a URI including an indication of the type of the IoT device 110. The URI may be captured or otherwise received by an access switch 210 configured to facilitate the IoT device 110 with the connection to the internet.

At "2," the MUD controller 106 may utilize the URI that was emitted by the IoT device 110 to request and/or pull a MUD file 202 from a MUD file server 112, associated with a manufacturer of the IoT device 110, on the internet. The computing resource network 102 may comprise a MUD controller 106 configured to facilitate the transmission of the URI from the IoT device 110 to the MUD file server 112. Additionally, or alternatively, the access switch 210 may be configured as an IoT gateway device and may be separate from or local to the computing resource network 102, and the access switch may have the MUD controller 106 operating thereon.

At "3," the MUD file server 112 may utilize the URI to identify a MUD file associated with the IoT device 110. In some examples, the MUD file server 112 may provide the MUD file to the IoT gateway device 104 and/or the MUD controller 106.

The MUD file may be configured in various ways, such as, for example, as a traditional MUD file in accordance with the MUD standard that may indicate which protocols and/or ports should be allowed for a particular IoT device 110. Additionally, or alternatively, the MUD standard MUD file 202 may be extended to include SASE extensions 204, such as, for example, enabling IoT devices 110 to consume manufacturer recommended security features via the SASE service 108 if such services are unavailable at the local site associated with the IoT device 110.

For example, the SASE extensions 204 to the MUD standard may include one or more indications from the manufacturer in the MUD file 202 indicating which SASE cloud-services 206 that are recommended on a per-IoT device basis. The MUD file 202 may include recommendations including cloud-based services 208(1)-208(N) such as, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy. Additionally, or alternatively, the MUD file 202 may provide a recommendation of the specific SASE cloud-service(s) 206 for each device. For example, if an IoT device 110 is configured as a temperature sensor, the MUD file 202 may contain recommendations and/or instructions to provide SCADA industrial protection, and may provide the details of a SIG associated with a corresponding cloud-based service 208, such that the IoT device 110 may connect to the SIG and the required security service(s) may be implemented accordingly.

At "4," the MUD controller 106 may receive the MUD file 202 including the SASE extensions 204 and either implement these security requirements to the network elements (i.e., the IoT device(s) 110) if the services are available to an IoT gateway local to the IoT device 110, or the MUD controller 106 may redirect traffic from the IoT device 110 to the recommended SASE cloud service 206 indicated in the MUD file 202 by the SASE extensions 204. The recommended SASE cloud services 206 may be configured as a recommendation, and a client may choose which services they wish to implement via the SASE service 108 and which services they wish to implement locally. Accordingly, an IoT gateway may be configured to offer local security services that are available and may utilize cloud-based services 208(1)-208(N) if the local security services are unavailable, for example.

Additionally, or alternatively, IoT devices, such as, for example, the IoT gateway device, may have varying amount of computational power and may not be able to support certain security services. Additionally, or alternatively, an organization and/or an enterprise may employ a security service that is not capable of implementing the recommended security services (e.g., SCADA). In such cases, the MUD controller 106 may be configured to make a decision to offer the security service locally, from the recommended SASE service 108 as indicated in the MUD file 202 by the SASE extensions 204, or to ignore the recommendation.

Figure 3:
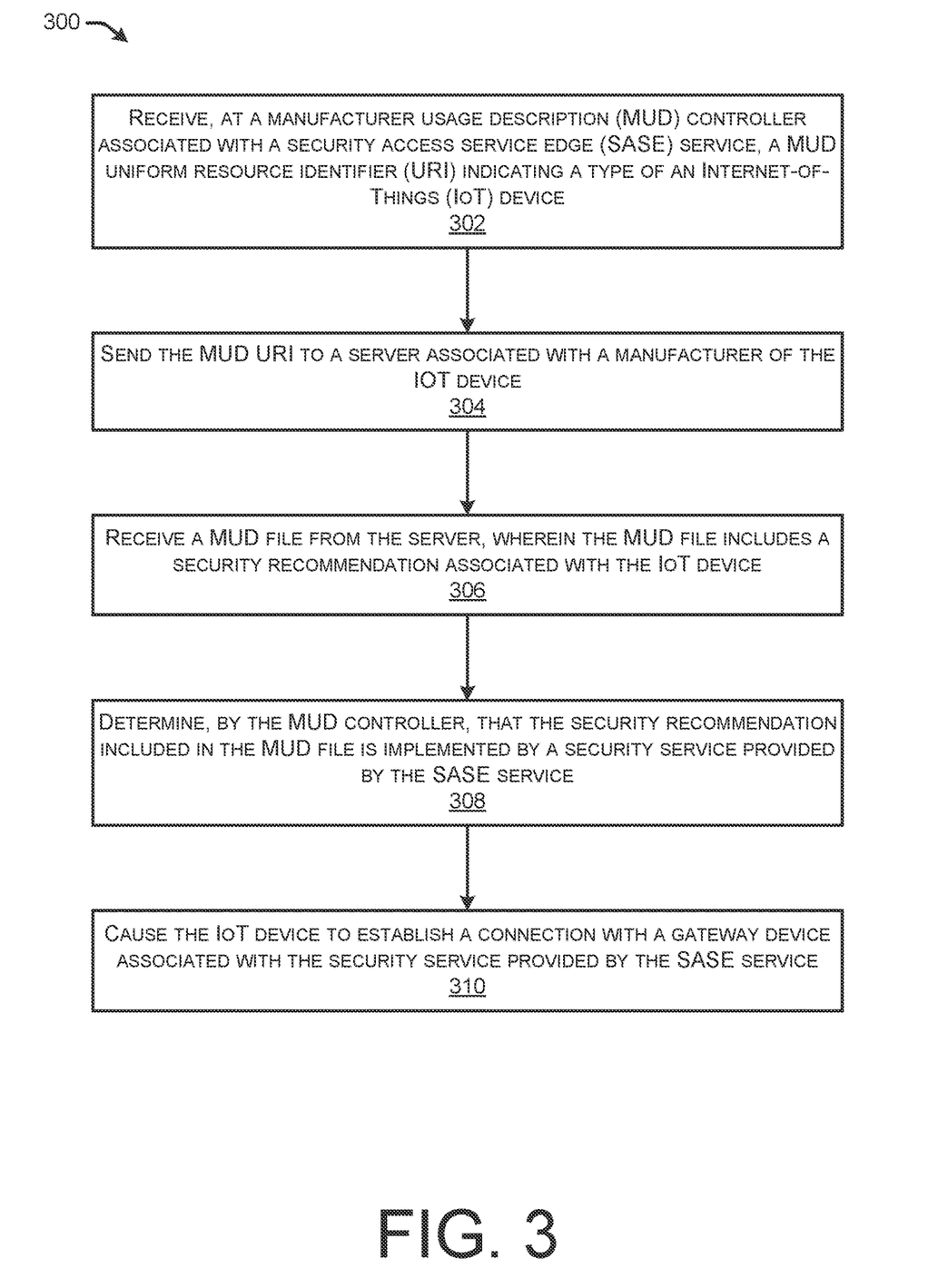
FIG. 3 illustrates a flow diagram of an example method for a MUD controller associated with a SASE service to receive a MUD file associated with an IoT device from a server associated with a manufacturer of the IoT device, determine that a security recommendation included in the MUD file is implemented by a cloud-based security service provided by the SASE service, and cause the IoT device to establish a connection with a gateway device associated with the cloud-based security service.
Figure 4:
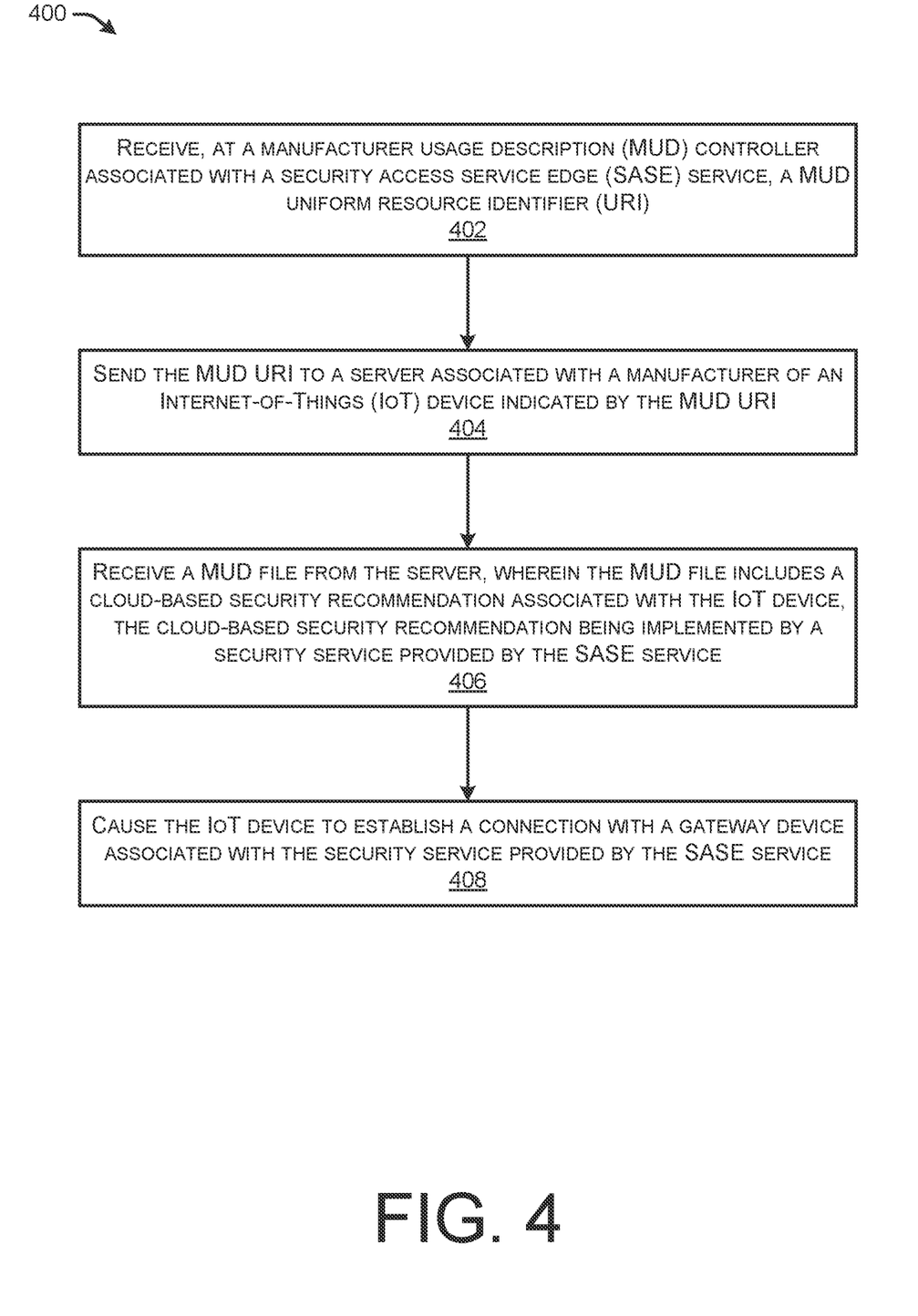
FIG. 4 illustrates a flow diagram of an example method for a MUD controller associated with a SASE service to receive a MUD file, including a cloud-based security recommendation associated with an IoT device, from a server associated with a manufacturer of the IoT device and causing the IoT device to establish a connection with a gateway device associated with a security service, configured to implement the cloud-based security recommendation, provided by the SASE service.

FIGS. 3 and 4 illustrate flow diagrams of example methods 300 and 400 and that illustrate aspects of the functions performed at least partly by the computing resource network 102, the MUD controller 106, and/or the SASE service 108 as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a MUD controller 106 associated with a SASE service 108 to receive a MUD file 202 associated with an IoT device 110 from a server 112 associated with a manufacturer of the IoT device 110, determine that a security recommendation included in the MUD file 202 is implemented by a cloud-based security service 208 provided by the SASE service 108, and cause the IoT device 110 to establish a connection with a gateway device associated with the cloud-based security service 208.

At 302, the method 300 may include receiving, at a manufacturer usage description (MUD) controller associated with a secure access service edge (SASE) service, a MUD uniform resource identifier (URI) indicating a type of an Internet-of-Things (IoT) device 110. In some examples, the IoT device 110 may be configured to emit the MUD URI.

At 304, the method 300 may include sending the MUD URI to a server associated with a manufacturer of the IoT device 110. In some examples, the server may be configured as the MUD file server 112 as described with respect to FIGS. 1 and 2.

At 306, the method 300 may include receiving a MUD file 202 from the server, wherein the MUD file 202 includes a security recommendation associated with the IoT device 110. Additionally, or alternatively, the MUD file 202 may include a cloud-based security recommendation associated with the IoT device 110. In some examples, the cloud-based security recommendation may be implemented by a security service provided by the SASE service 108.

At 308, the method 300 may include determining, by the MUD controller 106, that the security recommendation included in the MUD file 202 is implemented by a security service provided by the SASE service 108. In some examples, the MUD controller 106 may be configured to parse the MUD file 202 to determine an intent and the intent may be used to determine that the security recommendation is implemented by a security service provided by the SASE service 108.

At 310, the method 300 may include causing the IoT device 110 to establish a connection with a gateway device associated with the security service provided by the SASE service 108.

Additionally, or alternatively, the method 300 may include receiving communication data to be sent to the IoT device 110 from an additional IoT device 110. Additionally, or alternatively, the method 300 may include determining that the communication data is to be sent to the IoT device 110 via the connection with the gateway device based at least in part on the security recommendation. Additionally, or alternatively, the method 300 may include sending the communication data to the gateway device.

Additionally, or alternatively, the method 300 may include determining an intent associated with the security recommendation based at least in part on parsing the MUD file 202. Additionally, or alternatively, the method 300 may include mapping the intent to cloud-based security recommendations associated with the IoT device 110. In some examples, the cloud-based security recommendations may be implemented by the security service provided by the SASE service 108. Additionally, or alternatively, the method 300 may include generating a SASE profile associated with the IoT device 110 based at least in part on the mapping. Additionally, or alternatively, the method 300 may include sending the SASE profile to the gateway device.

Additionally, or alternatively, the MUD file 202 may include cloud-based security recommendations associated with the IoT device 110. In some examples, the cloud-based security recommendations may be implemented by the security service provided by the SASE service 108. Additionally, or alternatively, the method 300 may include generating a SASE profile associated with the IoT device 110 based at least in part on the cloud-based security recommendations. Additionally, or alternatively, the method 300 may include sending the SASE profile to the gateway device.

Additionally, or alternatively, the cloud-based security recommendations may include at least one of, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy.

Additionally, or alternatively, the MUD controller 106 may be configured to implement local security services associated with an additional security recommendation included in the MUD file 202. Additionally, or alternatively, the method 300 may include determining that the local security services associated with the additional security recommendation is unavailable. Additionally, or alternatively, the method 300 may include sending a request for a cloud-based security service 208 associated with the additional security recommendation to the gateway device. Additionally, or alternatively, the method 300 may include implementing the cloud-based security service 208 for the IoT device 110 by the security service provided by the SASE service 108.

Additionally, or alternatively, the method 300 may include generating, a SASE profile associated with the IoT device 110 based at least in part on the MUD file 202. Additionally, or alternatively, the method 300 may include sending the SASE profile to the gateway device. Additionally, or alternatively, the method 300 may include implementing the security recommendation associated with the IoT device 110 based at least in part on the SASE profile.

Additionally, or alternatively, the method 300 may include receiving, at an additional IoT device 110 and from the IoT device 110, a request to establish a connection between the IoT device 110 and the additional IoT device 110. Additionally, or alternatively, the method 300 may include determining that the SASE service 108 allows the connection between the IoT device 110 and the additional IoT device 110. Additionally, or alternatively, the method 300 may include establishing a secure connection between the IoT device 110 and the additional IoT device 110.

FIG. 4 illustrates a flow diagram of an example method 400 for a MUD controller 106 associated with a SASE service 108 to receive a MUD file 202, including SASE extensions 204 indicating a cloud-based security recommendation 208 associated with an IoT device 110, from a server 112 associated with a manufacturer of the IoT device 110 and causing the IoT device 110 to establish a connection with a gateway device associated with a security service, configured to implement the cloud-based security recommendation, provided by the SASE service 108.

At 402, the method 400 may include receiving, at a manufacturer usage description (MUD) controller associated with a secure access service edge (SASE) service, a MUD uniform resource identifier (URI). In some examples, an IoT device may be configured to emit the MUD URI.

At 404, the method 400 may include sending the MUD URI to a server associated with a manufacturer of an Internet-of-Things (IoT) device 110 indicated by the MUD URI. In some examples, the server may be configured as the MUD file server 112 as described with respect to FIGS. 1 and 2.

At 406, the method 400 may include receiving a MUD file 202 from the server, wherein the MUD file 202 includes a cloud-based security recommendation associated with the IoT device 110. In some examples, the cloud-based security recommendation may be implemented by a security service provided by the SASE service 108. Additionally, or alternatively, the MUD file 202 may include a security recommendation associated with the IoT device 110.

At 408, the method 400 may include causing the IoT device 110 to establish a connection with a gateway device associated with the security service provided by the SASE service 108.

Additionally, or alternatively, the method 400 may include receiving communication data to be sent to the IoT device 110 from an additional IoT device 110. Additionally, or alternatively, the method 400 may include determining that the communication data is to be sent to the IoT device 110 via the connection with the gateway device based at least in part on the cloud-based security recommendation. Additionally, or alternatively, the method 400 may include sending the communication data to the gateway device.

Additionally, or alternatively, the method 400 may include determining an intent associated with security recommendation included in the MUD file 202 based at least in part on parsing the MUD file 202. Additionally, or alternatively, the method 400 may include mapping the intent to additional cloud-based security recommendations associated with the IoT device 110. In some examples, the additional cloud-based security recommendations may be implemented by the security service provided by the SASE service 108. Additionally, or alternatively, the method 400 may include generating a SASE profile associated with the IoT device 110 based at least in part on the mapping. Additionally, or alternatively, the method 400 may include sending the SASE profile to the gateway device.

Additionally, or alternatively, the cloud-based security recommendations may include at least one of, but not limited to, a cloud access security broker (CASB), a firewall, an intrusion prevention system (IPS), a supervisory control and data acquisition (SCADA) deep packet inspection (DPI) service, a data loss prevention (DLP) service, a secure web gateway (SWG), DNS security, data encryption, and/or a message brokering proxy.

Additionally, or alternatively, the MUD controller 106 may be configured to implement local security services associated with a security recommendation included in the MUD file 202. Additionally, or alternatively, the method 400 may include determining that the local security services associated with the security recommendation is unavailable. Additionally, or alternatively, the method 400 may include sending a request for a cloud-based security service 208 associated with the security recommendation to the gateway device. Additionally, or alternatively, the method 400 may include implementing the cloud-based security service 208 for the IoT device 110 by the security service provided by the SASE service 108.

Additionally, or alternatively, the method 400 may include generating a SASE profile associated with the IoT device 110 based at least in part on the MUD file 202. In some examples, the MUD file 202 may include a security recommendation associated with the IoT device 110. Additionally, or alternatively, the method 400 may include sending the SASE profile to the gateway device. Additionally, or alternatively, the method 400 may include implementing the security recommendations associated with the IoT device 110 based at least in part on the SASE profile.

Figure 5:
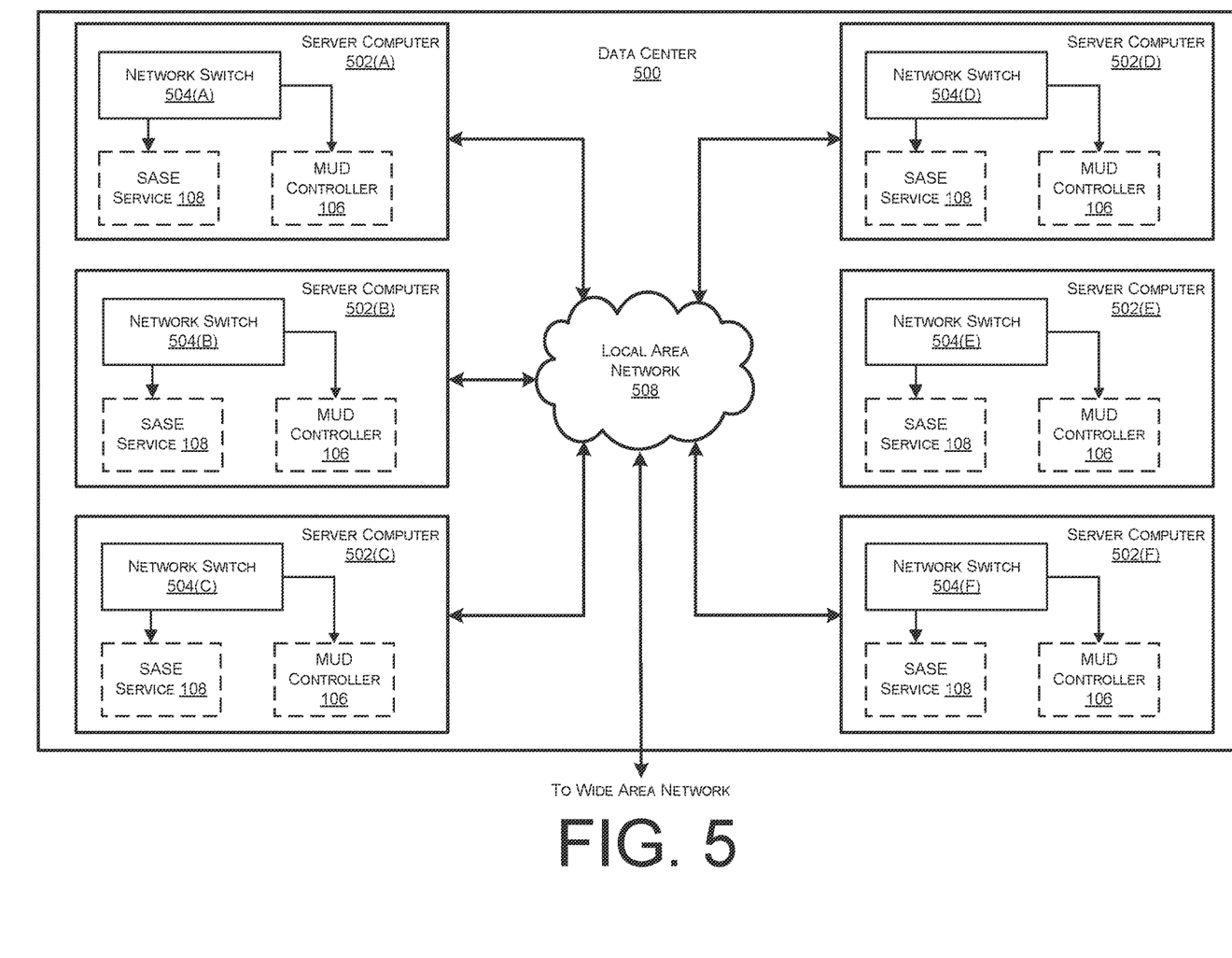
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, the servers described herein with respect to FIG. 1.

The server computers 502 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more network switch(es), the SASE service 108, and/or the MUD controller 106, provisioned across a set or cluster of servers 502.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 5.

Figure 6:
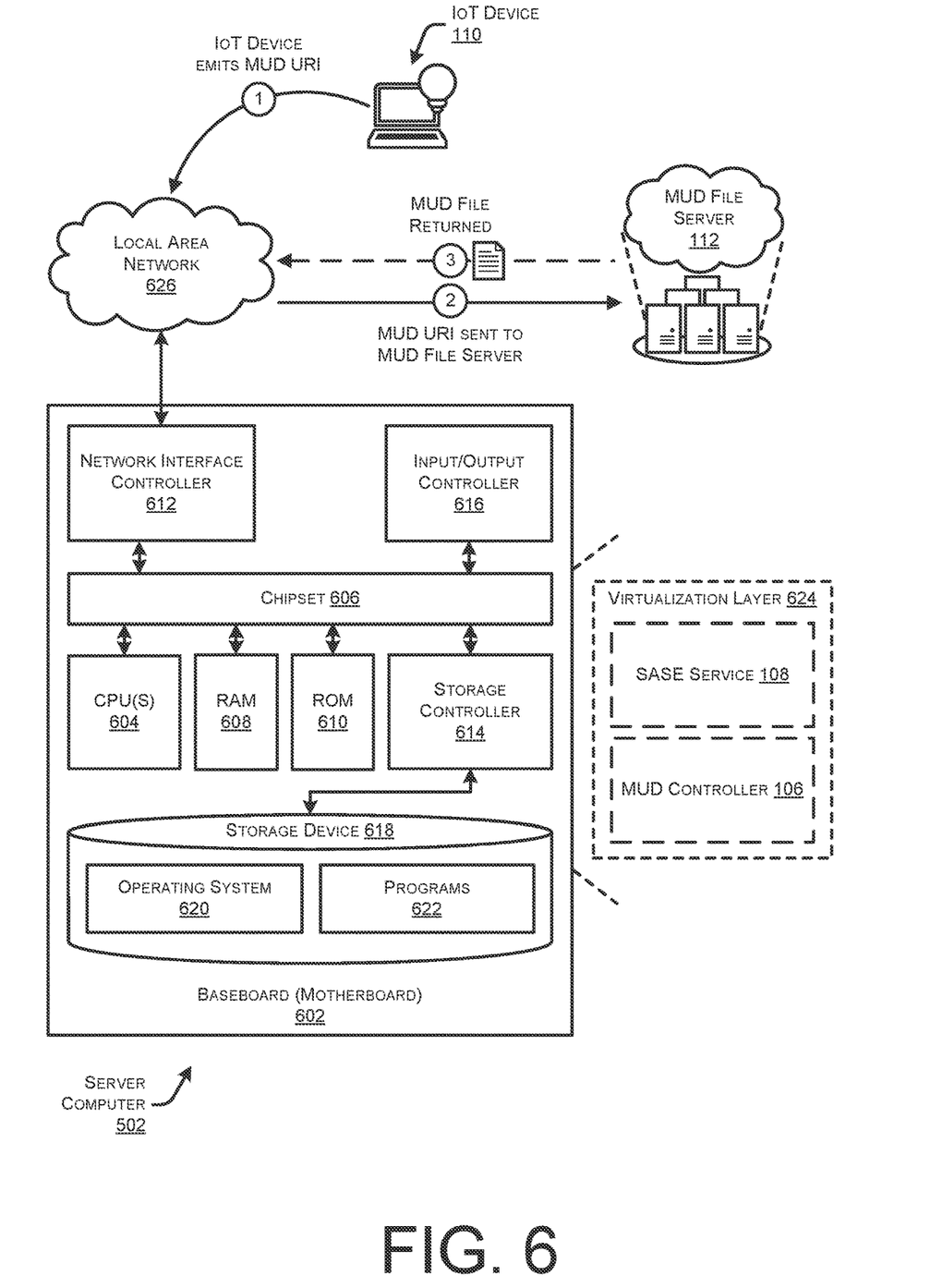
FIG. 6 is a computer architecture diagram showing an illustrative computer hardware architecture for implementing a server device that can be utilized to implement aspects of the various technologies presented herein.

FIG. 6 shows an example computer architecture for a computing device (or network switch) 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical server 116 described herein with respect to FIG. 1.

The computing device 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 502. The chipset 606 can further provide an interface to a computer-readable storage medium such as a read-only memory ("ROM") 610 or non-volatile RAM ("NVRAM") for storing basic routines that help to startup the computing device 502 and to transfer information between the various components and devices. The ROM 610 or NVRAM can also store other software components necessary for the operation of the computing device 502 in accordance with the configurations described herein.

The computing device 502 can operate in a networked environment using logical connections to remote computing devices and computer systems through a network, such as the network 626. The chipset 606 can include functionality for providing network connectivity through a NIC 612, such as a gigabit Ethernet adapter. The NIC 612 is capable of connecting the computing device 502 to other computing devices over the network 626 (or 212). It should be appreciated that multiple NICs 612 can be present in the computing device 502, connecting the computer to other types of networks and remote computer systems.

The computing device 502 can be connected to a storage device 618 that provides non-volatile storage for the computing device 502. The storage device 618 can store an operating system 620, programs 622, and data, which have been described in greater detail herein. The storage device 618 can be connected to the computing device 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 618 by detecting the physical states or characteristics of one or more particular locations within the physical storage units.

In addition to the mass storage device 618 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the computing resource network 102, and or any components included therein, may be supported by one or more devices similar to computing device 502. Stated otherwise, some or all of the operations performed by the computing resource network 102, and or any components included therein, may be performed by one or more computing device 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 502.

In one embodiment, the storage device 618 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 604 transition between states, as described above. According to one embodiment, the computing device 502 has access to computer-readable storage media storing computer-executable instructions which, when executed by the computing device 502, perform the various processes described above with regard to FIGS. 1-4. The computing device 502 can also include computer-readable storage media having instructions stored thereupon for performing any of the other computer-implemented operations described herein.

The computing device 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 502 might not include all of the components shown in FIG. 5, can include other components that are not explicitly shown in FIG. 5, or might utilize an architecture completely different than that shown in FIG. 5.

The server computer 502 may support a virtualization layer 624, such as one or more security implementation services, such as, for example, the SASE service 108 and/or the MUD controller 106 executing on the server computer 502. In some examples, the virtualization layer 624 may be supported by a hypervisor that provides one or more virtual machines running on the server computer 502 to perform functions described herein. The virtualization layer 624 may generally support a virtual resource that performs at least portions of the techniques described herein. An IoT device 110 may emit a MUD URI, that the MUD controller 106 may utilize to fetch a MUD file 202 from a MUD file server 112. The MUD file may be parsed by the MUD controller 106 to determine the intent and translate the intent to SASE security requirements that may be implemented by the SASE service 108. Additionally, or alternatively, the MUD file may include SASE extensions to the MUD standard that may include one or more indications from the manufacturer in the MUD file indicating which SASE services are recommended on a per-IoT device basis.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
  receiving, at a manufacturer usage description (MUD) controller associated with a gateway device, a MUD uniform resource identifier (URI) indicating a type of an Internet-of-Things (IoT) device, wherein the gateway device connects the IoT device with a cloud-based security service;
  sending the MUD URI to a server associated with a manufacturer of the IoT device;
  receiving a MUD file from the server, wherein the MUD file includes a security recommendation associated with the IoT device;
  determining, by the MUD controller, that the security recommendation included in the MUD file is implemented by a security service provided by the cloud-based security service; and
  causing the IoT device to establish a connection with the cloud-based security service providing the security service.

2. The method of claim 1, further comprising:
  receiving communication data to be sent to the IoT device from an additional IoT device;
  determining that the communication data is to be sent to the IoT device via the connection with the cloud-based security service based at least in part on the security recommendation; and
  sending the communication data to the cloud-based security service via the gateway device.

3. The method of claim 1, further comprising:
  determining an intent associated with the security recommendation based at least in part on parsing the MUD file;
  mapping the intent to cloud-based security recommendations associated with the IoT device, the cloud-based security recommendations being implemented by the security service provided by the cloud-based security service;
  generating a security profile associated with the IoT device based at least in part on the mapping; and
  sending the security profile to the gateway device.

4. The method of claim 1, wherein the MUD file includes cloud-based security recommendations associated with the IoT device, the cloud-based security recommendations being implemented by the security service provided by the cloud-based security service, and the method further comprising:
  generating a security profile associated with the IoT device based at least in part on the cloud-based security recommendations; and
  sending the security profile to the gateway device.

5. The method of claim 4, wherein the cloud-based security recommendations include at least one of:
  a cloud access security broker (CASB);
  a firewall;
  an intrusion prevention system (IPS);
  a supervisory control and data acquisition (SCADA) deep packet inspection (DPI) service;
  a data loss prevention (DLP) service; or
  a message brokering proxy.

6. The method of claim 1, wherein the MUD controller is configured to implement local security services associated with an additional security recommendation included in the MUD file, and the method further comprising:
determining that the local security services associated with the additional security recommendation is unavailable;
sending a request for the security service provided by the cloud-based security service, the security service being associated with the additional security recommendation to the gateway device; and
implementing the security service provided by the cloud-based security service for the IoT device.

7. The method of claim 1, further comprising:
generating, a security profile associated with the IoT device based at least in part on the MUD file;
sending the security profile to the gateway device; and
implementing the security recommendation associated with the IoT device based at least in part on the security profile.

8. The method of claim 1, further comprising:
receiving, at an additional IoT device and from the IoT device, a request to establish a connection between the IoT device and the additional IoT device;
determining that the cloud-based security service allows the connection between the IoT device and the additional IoT device; and
establishing a secure connection between the IoT device and the additional IoT device.

9. A system comprising:
one or more processors; and
one or more computer-readable media storing computer-executable instructions that, when executed by the one or more processors, cause the one or more processors to perform operations comprising:
receiving, at a manufacturer usage description (MUD) controller associated with a gateway device, a MUD uniform resource identifier (URI), wherein the gateway device connects the IoT device with a cloud-based security service;
sending the MUD URI to a server associated with a manufacturer of an Internet-of-Things (IoT) device indicated by the MUD URI;
receiving a MUD file from the server, wherein the MUD file includes a cloud-based security recommendation associated with the IoT device, the cloud-based security recommendation being implemented by a security service provided by the cloud-based security service; and
causing the IoT device to establish a connection with the cloud-based security service providing the security service.

10. The system of claim 9, the operations further comprising:
receiving communication data to be sent to the IoT device from an additional IoT device;
determining that the communication data is to be sent to the IoT device via the connection with the cloud-based security service based at least in part on the cloud-based security recommendation; and
sending the communication data to the cloud-based security service via the gateway device.

11. The system of claim 9, the operations further comprising:
determining an intent associated with security recommendation included in the MUD file based at least in part on parsing the MUD file;
mapping the intent to additional cloud-based security recommendations associated with the IoT device, the additional cloud-based security recommendations being implemented by the security service provided by the cloud-based security service;
generating a security profile associated with the IoT device based at least in part on the mapping; and
sending the security profile to the gateway device.

12. The system of claim 9, wherein the cloud-based security recommendations includes at least one of:
a cloud access security broker (CASB);
a firewall;
an intrusion prevention system (IPS);
a supervisory control and data acquisition (SCADA) deep packet inspection (DPI) service;
a data loss prevention (DLP) service; or
a message brokering proxy.

13. The system of claim 9, wherein the MUD controller is configured to implement local security services associated with a security recommendation included in the MUD file, and the operations further comprising:
determining that the local security services associated with the security recommendation is unavailable;
sending a request for a cloud-based security service associated with the security recommendation to the gateway device; and
implementing the cloud-based security service for the IoT device by the security service provided by the cloud-based security service.

14. The system of claim 9, the operations further comprising:
generating a security profile associated with the IoT device based at least in part on the MUD file, the MUD file including a security recommendation associated with the IoT device;
sending the security profile to the gateway device; and
implementing the security recommendations associated with the IoT device based at least in part on the security profile.

15. A method comprising:
receiving, at a manufacturer usage description (MUD) controller associated with a gateway device, a MUD uniform resource identifier (URI), wherein the gateway device connects the IoT device with a cloud-based security service;
sending the MUD URI to a server associated with a manufacturer of an Internet-of-Things (IoT) device indicated by the MUD URI;
receiving a MUD file from the server, wherein the MUD file includes a cloud-based security recommendation associated with the IoT device, the cloud-based security recommendation being implemented by a security service provided by the cloud-based security service; and
causing the IoT device to establish a connection with the cloud-based security service providing the security service.

16. The method of claim 15, further comprising:
receiving communication data to be sent to the IoT device from an additional IoT device;
determining that the communication data is to be sent to the IoT device via the connection with the cloud-based security service based at least in part on the cloud-based security recommendation; and
sending the communication data to the cloud-based security service via the gateway device.

17. The method of claim 15, further comprising:
determining an intent associated with the cloud-based security recommendation included in the MUD file based at least in part on parsing the MUD file;
mapping the intent to additional cloud-based security recommendations associated with the IoT device, the additional cloud-based security recommendations being implemented by the security service provided by the cloud-based security service;
generating a security profile associated with the IoT device based at least in part on the mapping; and
sending the security profile to the gateway device.

18. The method of claim 15, wherein the cloud-based security recommendation includes at least one of:
a cloud access security broker (CASB);
a firewall;
an intrusion prevention system (IPS);
a supervisory control and data acquisition (SCADA) deep packet inspection (DPI) service;
a data loss prevention (DLP) service; or
a message brokering proxy.

19. The method of claim 15, wherein the MUD controller is configured to implement local security services associated with a security recommendation included in the MUD file, and the method further comprising:
determining that the local security services associated with the security recommendation is unavailable;
sending a request for a cloud-based security service associated with the security recommendation to the gateway device; and
implementing the cloud-based security service for the IoT device by the security service provided by the cloud-based security service.

20. The method of claim 15, further comprising:
generating a security profile associated with the IoT device based at least in part on the MUD file, the MUD file including a security recommendation associated with the IoT device;
sending the security profile to the gateway device; and
implementing the security recommendations associated with the IoT device based at least in part on the security profile.

* * * * *